(12) United States Patent
Xue et al.

(10) Patent No.: US 8,767,555 B1
(45) Date of Patent: Jul. 1, 2014

(54) INTELLIGENT ROUTING OF VOICE-OVER-PACKET CALLS

(75) Inventors: Wen Xue, Overland Park, KS (US);
Stevan A. Klesper, Ashburn, VA (US);
Arun Manroa, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 709 days.

(21) Appl. No.: 12/464,242

(22) Filed: May 12, 2009

(51) Int. Cl.
*H04M 7/12* (2006.01)
*H04W 40/00* (2009.01)

(52) U.S. Cl.
CPC ............ *H04M 7/1205* (2013.01); *H04W 40/00* (2013.01)
USPC ........................................................ 370/238

(58) Field of Classification Search
CPC ....... H04W 40/00; H04W 40/38; H04M 7/00; H04M 7/16
USPC .......................................................... 370/238
See application file for complete search history.

(56) References Cited

U.S. PATENT DOCUMENTS

| | | | |
|---|---|---|---|
| 5,550,912 A | 8/1996 | Akinpelu et al. | |
| 6,389,291 B1 | 5/2002 | Pande et al. | |
| 6,427,120 B1 | 7/2002 | Garin et al. | |
| 6,490,347 B2 | 12/2002 | DeCaluwe et al. | |
| 6,704,406 B1 * | 3/2004 | Pearce et al. | 379/221.01 |
| 6,963,635 B1 | 11/2005 | Jones | |
| 7,031,714 B1 | 4/2006 | Rayburn | |
| 2002/0073203 A1* | 6/2002 | Gilleland | 709/227 |
| 2002/0141386 A1* | 10/2002 | Minert et al. | 370/352 |
| 2002/0167906 A1* | 11/2002 | La Porta et al. | 370/252 |
| 2004/0156380 A1* | 8/2004 | Silverman et al. | 370/428 |
| 2006/0002380 A1* | 1/2006 | Bollinger et al. | 370/352 |
| 2010/0220852 A1* | 9/2010 | Willman | 379/265.11 |

\* cited by examiner

*Primary Examiner* — Jason Mattis
*Assistant Examiner* — Stephen J Clawson

(57) ABSTRACT

What is disclosed is a method of operating a call processing system to route a voice-over-packet call between a wireless communication device and a destination device, where the destination device is located in a geographic area served by a communication network. The method includes receiving a request for the call originating from the wireless communication device, where the request comprises a destination identifier of the destination device and a location identifier of the wireless communication device. The method also includes processing the destination identifier and the location identifier to determine if the wireless communication device is located in the geographic area served by the communication network. The method also includes selecting a first route for the call from a packet network serving the wireless communication device to the communication network serving the destination device if the wireless communication device is located in the geographic area served by the communication network, and selecting a second route for the call from the packet network serving the wireless communication device to the communication network serving the destination device if the wireless communication device is not located in the geographic area served by the communication network. The method also includes transferring routing instructions for the call.

14 Claims, 5 Drawing Sheets

INTELLIGENT ROUTING OF VOICE-OVER-PACKET CALLS

TECHNICAL FIELD

Aspects of the disclosure are related to the field of communications, and in particular, routing of voice-over-packet calls in communication networks.

TECHNICAL BACKGROUND

Conventional telecommunication networks typically include many calling areas to cover a particular geographic area, with communication trunks used to transfer calls between different calling areas. These communication trunks and calling areas can be operated by different companies, or exchange carriers, with some communication trunks used to interconnect different calling areas, sometimes over long distances.

Voice-over-packet technologies allow phone calls to be routed over packet networks, such as the Internet, instead of over the calling areas and trunks of conventional telecommunication networks. Wireless communication devices operating in wireless communication networks are also able to place calls using voice-over-packet technology. Calls which originate in wireless communication devices using voice-over-packet technology can be placed to other wireless communication devices, or to non-wireless telecommunication devices, such as conventional telephones communicating over the public switched telephone network (PSTN).

However, when placing voice-over-packet calls of wireless communication devices over a packet network, routing the calls can become difficult and can lead to inefficient or undesirable routing, especially when interacting with conventional circuit-switched communication trunks and calling areas. This can increase usage costs and call delays for both the users of wireless communication devices and for the operator of the wireless communication network.

OVERVIEW

What is disclosed is a method of operating a call processing system to route a voice-over-packet call between a wireless communication device and a destination device, where the destination device is located in a geographic area served by a communication network. The method includes receiving a request for the call originating from the wireless communication device, where the request comprises a destination identifier of the destination device and a location identifier of the wireless communication device. The method also includes processing the destination identifier and the location identifier to determine if the wireless communication device is located in the geographic area served by the communication network. The method also includes selecting a first route for the call from a packet network serving the wireless communication device to the communication network serving the destination device if the wireless communication device is located in the geographic area served by the communication network, and selecting a second route for the call from the packet network serving the wireless communication device to the communication network serving the destination device if the wireless communication device is not located in the geographic area served by the communication network. The method also includes transferring routing instructions for the call.

What is also disclosed is a call processing system to route a voice-over-packet call between a wireless communication device and a destination device, where the destination device is located in a geographic area served by a communication network. The call processing system includes a communication interface configured to receive a request for the call originating from the wireless communication device, wherein the request comprises a destination identifier of the destination device and a location identifier of the wireless communication device. The call processing system also includes a processing system configured to process the destination identifier and the location identifier to determine if the wireless communication device is located in the geographic area served by the communication network. The processing system is configured to select a first route for the call from a packet network serving the wireless communication device to the communication network serving the destination device if the wireless communication device is located in the geographic area served by the communication network, and select a second route for the call from the packet network serving the wireless communication device to the communication network serving the destination device if the wireless communication device is not located in the geographic area served by the communication network. The communication interface is also configured to transfer routing instructions for the call.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
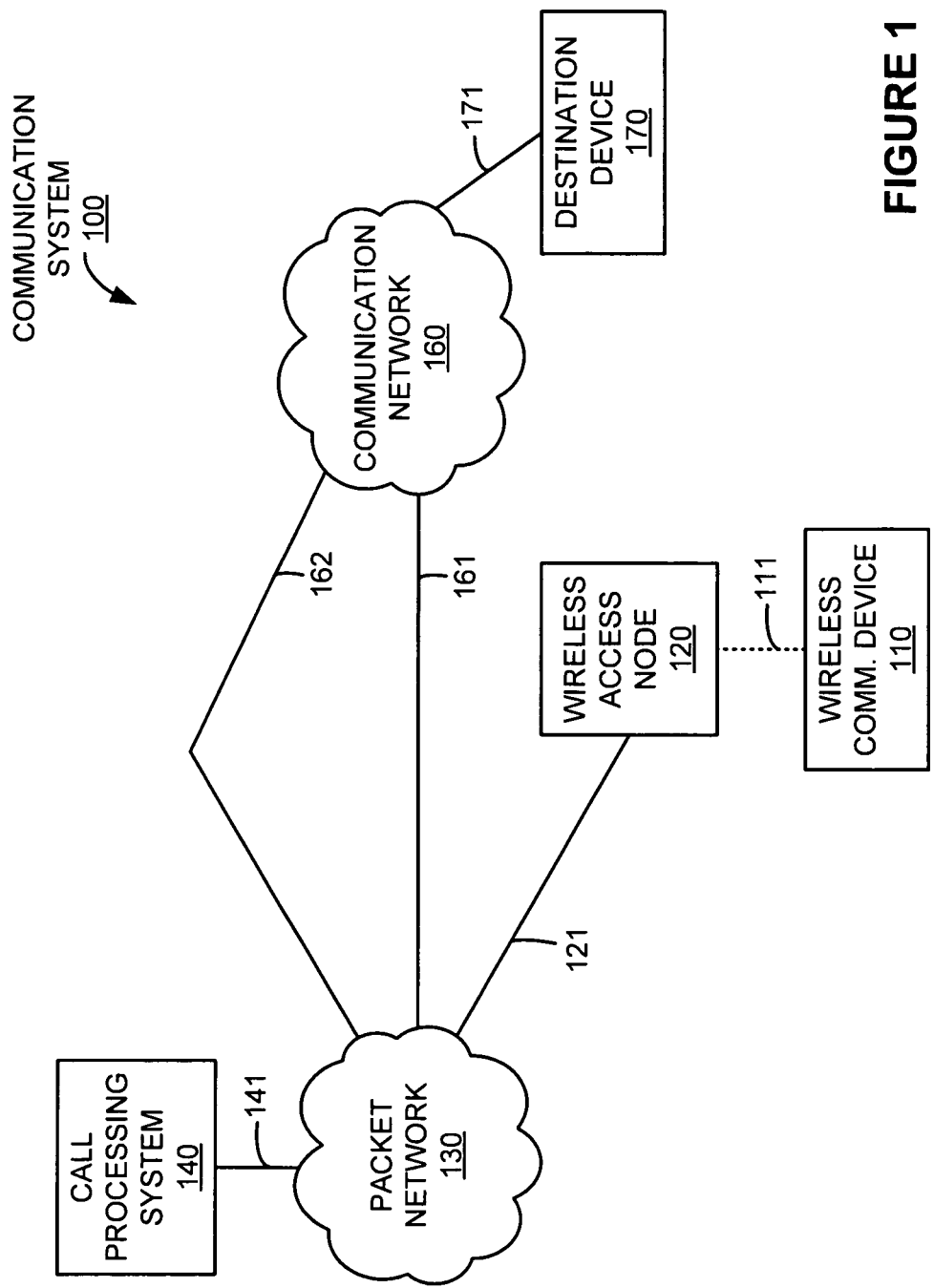
FIG. 1 is a system diagram illustrating a communication system.

FIG. 1 is a system diagram illustrating communication system 100. Communication system 100 includes wireless communication device 110, wireless access node 120, packet network 130, call processing system 140, communication network 160, and destination device 170. Wireless communication device 110 and wireless access node 120 communicate over wireless link 111. Wireless access node 120 and packet network 130 communicate over link 121. Call processing system 140 and packet network 130 communicate over link 141. Destination device 170 and communication network 160 communicate over link 171. Packet network 130 and communication network 160 can communicate over first route 161 or second route 162.

In the example shown in FIG. 1, destination device 170 is located in a geographic area served by communication network 160. Wireless communication device 110, in many examples, is a mobile communication device, and may be located in the geographic area served by communication network 160, or may be in other geographic areas. Packet network 130 handles communications for wireless communication device 110.

Figure 2:
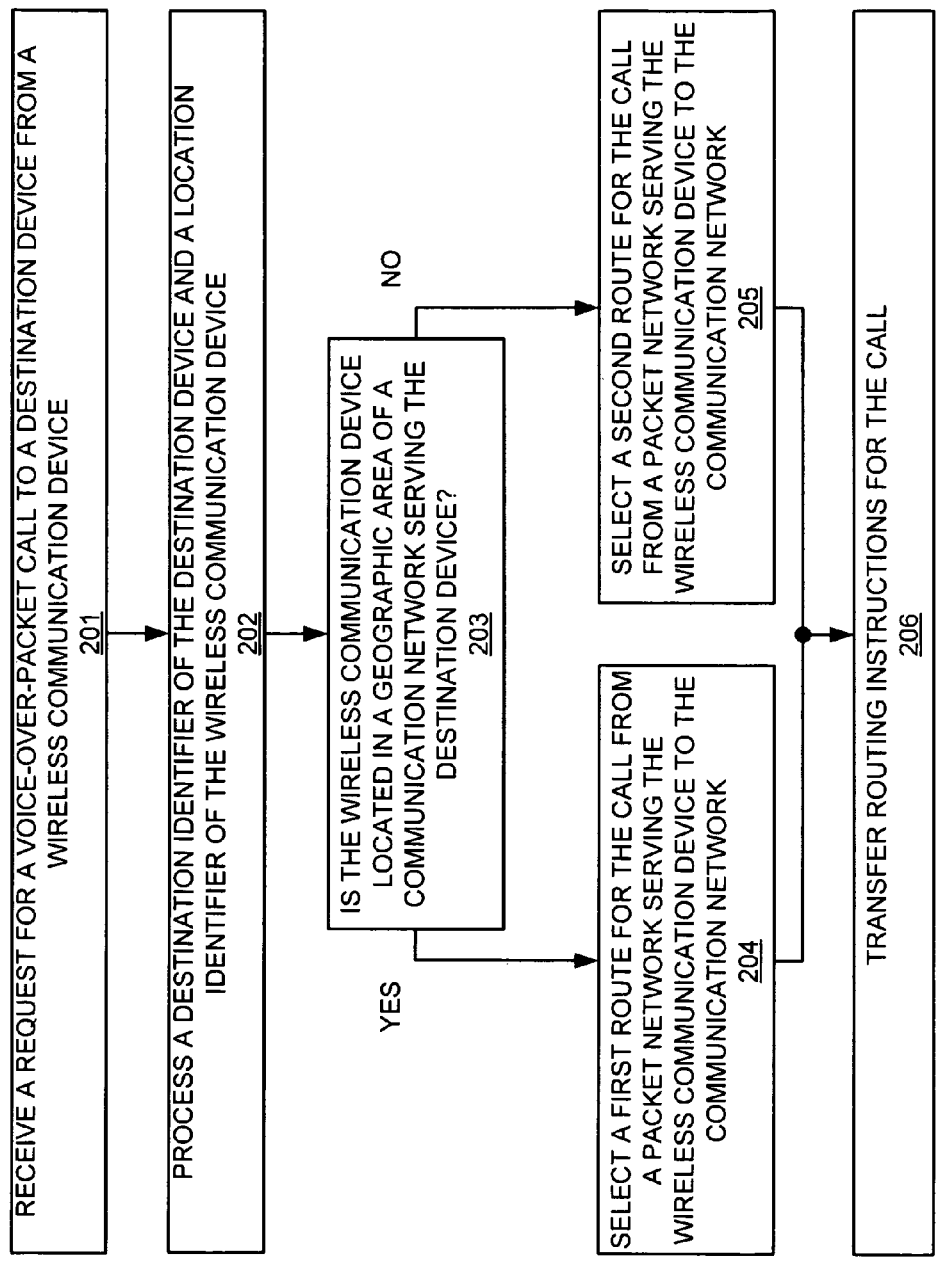
FIG. 2 is a flow diagram illustrating a method of operation of a communication system.

FIG. 2 is a flow diagram illustrating a method of operation of communication system 100, as found in FIG. 1. The operations listed in FIG. 2 are indicated herein parenthetically. In FIG. 2, call processing system 140 receives (201) a request for a voice-over-packet (VoP) call to destination device 170 from wireless communication device 110. In this example, the call request is received through packet network 130.

A voice-over-packet call includes packet-based voice communication sessions initiated by a user device, such as wireless communication device 110, and routed over a packet network to a destination. In some examples, the voice-over-packet call occurs through multiple networks, such as shown in FIG. 1 when the call placed by wireless communication device 110 to destination device 170 is over both packet network 130 and communication network 160.

In some examples, a destination for the call is selected by a user of wireless communication device 110 through a user interface of wireless communication device 110, and a call request is generated by wireless communication device 110. In further examples, the VoP call is a voice over Internet Protocol (VoIP) call, and the request is a call invite message in the session initiation protocol (SIP) call signaling format.

Also, in this example, the request for the call includes a destination identifier of destination device 170 and a location identifier of wireless communication device 110. The destination identifier is an identifier associated with destination device 170. The destination identifier could be a phone number, a network address, or other identifier associated with destination device 170, including combinations thereof. In typical examples, the location identifier is associated with the geographic location of wireless communication device 110. In some examples, the location identifier includes a geographic location of wireless communication device 110 such as a geographic coordinates, a global-positioning (GPS) location, a sector identifier of wireless access node 120, or some other identifier, including combinations thereof. In other examples, the location identifier includes an identifier of wireless access node 120, through which wireless communication device 110 is communicating. The identifier of wireless access node 120 could include a base station identifier (BSID), an antenna tower identifier, a geographic location of wireless access node 120, or some other identifier, including combinations thereof.

Call processing system 140 processes (202) the destination identifier of the destination device and the location identifier of the wireless communication device to determine (203) if wireless communication device 110 is located in the geographic area of communication network 160 which is serving destination device 170. In examples where the location identifier includes an identifier of wireless access node 120, the location identifier is processed to determine if wireless access node 120 is associated with the geographic area served by communication network 160.

If wireless communication device 110 is located in the geographic area served by communication network 160, then call processing system 140 selects (204) first route 161 for the call from packet network 130 to communication network 160. However, if wireless communication device 110 is not located in the geographic area served by communication network 160, then call processing system 140 selects (205) second route 162 for the call from packet network 130 to communication network 160.

Call processing system 140 then transfers (206) routing instructions for the call. In some examples, these routing instructions are transferred for delivery to packet network 130, where packet network 130 routes the voice-over-packet call according to the routing instructions. In other examples, transferring the routing instructions include transferring another destination identifier for delivery to wireless communication device 110. The other destination identifier could indicate a network address for equipment such as a router, gateway, or other equipment in packet network 130 associated with communication network 160. In SIP examples, call processing system 140 could transfer a SIP acknowledge message for delivery to wireless communication device 110, where the SIP acknowledge message could include the other destination identifier, among other information.

Referring back to FIG. 1, wireless communication device 110 comprises radio frequency (RF) communication circuitry and an antenna. The RF communication circuitry typically includes an amplifier, filter, modulator, and signal processing circuitry. Wireless communication device 110 may also include a user interface, memory device, computer-readable storage medium, software, processing circuitry, or some other communication components. Wireless communication device 110 may be a telephone, computer, e-book, mobile Internet appliance, wireless network interface card, media player, game console, or some other wireless communication apparatus, including combinations thereof. In many examples, wireless communication device 110 is a mobile communication device.

Wireless access node 120 comprises RF communication and control circuitry and an antenna. The RF communication circuitry typically includes an amplifier, filter, RF modulator, and signal processing circuitry. Wireless access node 120 may also comprise a router, server, memory device, software, processing circuitry, cabling, power supply, network communication interface, physical structural support, or some other communication apparatus. Wireless access node 120 could be a base station, base transceiver station, Internet access node, telephony service node, wireless data access point, or some other wireless communication system, including combinations thereof.

Packet network 130 could include a core network of a communication service provider, the Internet, a voice-over-packet network, a voice-over IP (VoIP) network, a wireless communication network, an optical network, an enterprise network, a local area network, or some other type of packet communication network or communication equipment, including combinations thereof. Many examples of packet network 130 include routers, gateways, media gateways, packet inspection equipment, or other equipment to handle packet data and interface between the packet format of packet network 130 and the communications formats of links 161-162.

Call processing system 140 includes equipment for receiving and processing call requests from wireless communication device 110. Call processing system 140 may include a communication interface, processing systems, network interfaces, or other communications equipment, including combinations thereof. Call processing system 140 could also incorporate a computer microprocessor, logic circuit, or some other processing device, and may be distributed among multiple processing devices. In some examples, call processing system 140 is located within the same equipment in which packet network 130 is located. Call processing system 140 could include a computer-readable medium such as a disk, tape, integrated circuit, server, or some other memory device, which could be distributed among multiple memory devices.

Call processing system 140 may include an operating system, logs, utilities, drivers, networking software, and other software typically loaded onto a computer system. Software of call processing system 140 could contain an application program, firmware, or some other form of computer-readable processing instructions.

Communication network 160 could include routers, gateways, telecommunication switches, trunks, exchanges, class 4 switches, class 5 switches, or other telecommunications equipment for providing telecommunication services to customers in a geographic area, such as destination device 170 over link 171. In some examples, communication network 160 is a local exchange carrier of a public switched telephone network (PSTN).

It should be understood that while communication network 160 may include conventional circuit-switched equipment for providing telecommunication service over link 171 to destination device 170, communication network 160 could also include other networks and systems to interface with links 161-162, such as optical networks, asynchronous transfer mode (ATM) networks, packet networks, metropolitan-area networks (MAN), or other network topologies, equipment, or systems, including combinations thereof.

Destination device 170 may be a telephone, computer, e-book, Internet appliance, network interface card, media player, game console, or some other communication apparatus, including combinations thereof. In some examples, destination device 170 is a telephone configured to communicate with a local exchange carrier of the PSTN.

Wireless link 111 uses the air or space as the transport media. Wireless link 111 may use various protocols, such as Code Division Multiple Access (CDMA), Evolution Data Optimized (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Communication links 121, 141, and 171 each use metal, glass, optical, air, space, or some other material as the transport media. Communication links 121, 141, and 171 could each use various communication protocols, such as Time Division Multiplex (TDM), Internet Protocol (IP), session initiation protocol (SIP), Ethernet, communication signaling, CDMA, EVDO, WIMAX, GSM, LTE, WIFI, HSPA, or some other communication format, including combinations thereof. Also, in this example, link 171 could be a local loop circuit used by communication network 160 to provide communication services to destination device 170.

Communication links 161-162 each use metal, glass, optical, air, space, or some other material as the transport media. Communication links 161-162 could each use various communication protocols, such as Time Division Multiplex (TDM), asynchronous transfer mode (ATM), Internet Protocol (IP), Ethernet, synchronous optical networking (SONET), communication signaling, or some other communication format, including combinations thereof. Communication links 161-162 could also comprise telecommunication network trunks for interconnecting communication networks. The trunks could be comprised of TDM links such as T1, T3, or similar, or could each be optical carriers (OC). The trunks could be long-distance circuits, local circuits, interexchanges, or a part of a metropolitan-area network (MAN), ring topology, and could incorporate redundant or backup links.

Communication links 111, 121, 141, 161-162, and 171 may each include many different signals sharing the same link. Communication links 111, 121, 141, 161-162, and 171 could each include multiple signals operating in a single path—as represented by the associated lines in FIG. 1—comprising access channels, forward links, reverse links, beacon signals, user communications, communication sessions, overhead communications, frequencies, timeslots, transportation ports, logical transportation links, network sockets, packets, or communication directions. Communication links 111, 121, 141, 161-162, and 171 could each be a direct link or may include intermediate networks, systems, or devices.

Figure 3:
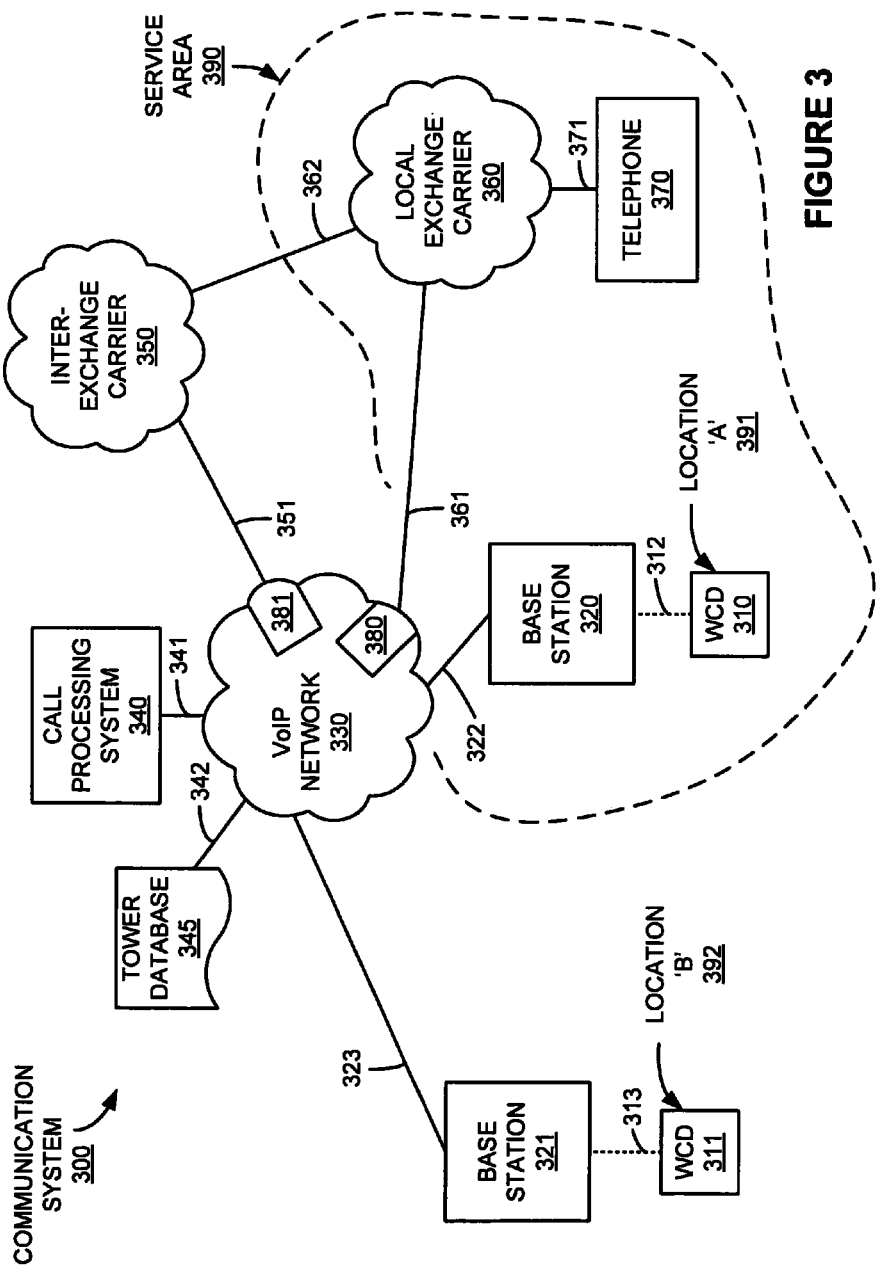
FIG. 3 is a system diagram illustrating a communication system.

FIG. 3 is a system diagram illustrating communication system 300. Communication system 300 includes wireless communication devices (WCD) 310-311, base stations 320-321, voice-over-IP (VoIP) network 330, call processing system 340, tower database 345, interexchange carrier (IXC) 350, local exchange carrier (LEC) 360, and telephone 370.

WCD 310-311 and base stations 320-321 communicate over wireless links 312-313, respectively. Base stations 320-321 and VoIP network 330 communicate over links 322-323, respectively. Call processing system 340 and VoIP network 330 communicate over link 341. Tower database 345 and VoIP network 330 communicate over link 342. LEC 360 and VoIP network 330 communicate over link 361. IXC 350 and VoIP network 330 communicate over link 351. IXC 350 and LEC 360 communicate over link 362. Telephone 370 and LEC 360 communicate over link 371.

In the example shown in FIG. 3, telephone 370 is located in a geographic area served by LEC 362, shown as service area 390. Also in FIG. 3, WCD 310, at location 'A' 391, receives wireless communication service from base station 320, which is also located in service area 390 served by LEC 362. WCD 311, at location 'B' 392, receives wireless communication service from base station 321 which is not located in service area 390.

Base stations 320-321 each include wireless communications equipment capable of communicating with and providing communication service to wireless communication devices. Base stations 320-321 each comprise antennas, transceivers, and other equipment for communicating with and controlling WCD 310-311, or other wireless communication devices. In this example, WCD 310-311 each comprise a mobile wireless telephone. FIG. 3 shows WCD 310 presently at location 'A' 391 and WCD 311 presently at location 'B' 392.

VoIP network 330 includes media gateway controllers (MGC) 380-381. MGC each 380-381 include circuitry and equipment for converting and exchanging communications in the packet format of VoIP network 330 with the PSTN format of trunks 351 and 361, and vice versa. Examples of MGC 380-381 can include packet processing systems, class 4 or class 5 telephone switches, data buffers, packetizing equipment, signal processing equipment, or other equipment, including combinations thereof. VoIP network 330 could also include call processing equipment, routers, gateways, as well as other type of communication and processing equipment, including combinations thereof.

Call processing system 340 includes equipment for receiving and processing VoIP call requests from WCD 310-311. Call processing system 340 may include a communication interface, processing systems, network interfaces, or other communications equipment, including combinations thereof. Call processing system 340 could also incorporate a computer microprocessor, logic circuit, or some other processing device, and may be distributed among multiple processing devices. In some examples, call processing system 340 is located within the same equipment in which VoIP network 330 is located. Call processing system 340 could include a computer-readable medium such as a disk, tape, integrated circuit, server, or some other memory device, which could be distributed among multiple memory devices. Call processing system 340 may include an operating system, logs, utilities, drivers, networking software, and other software typically loaded onto a computer system. Software of call processing system 340 could contain an application program, firmware, or some other form of computer-readable processing instructions.

Tower database 345 includes information related to the geographic locations of base stations associated with VoIP network 330. Tower database 345 could include geographic locations of base stations 320-321, among other base stations, organized by an identifier of each base station. Tower database 345 could incorporate a computer microprocessor, circuitry, or some other processing device or software system, and may be distributed among multiple processing devices. In some examples, tower database 345 is located within the same equipment as call processing system 340. Tower database 345 may also include software such as an operating system, logs, other databases, utilities, drivers, networking software, or other software stored on a computer-readable medium.

Interexchange carrier (IXC) 350 includes a telephone exchange used for long distance communications in the PSTN to interconnect telephone central offices of different local-exchange carriers. The interconnected central offices could be operated by different companies. Interexchange carrier 350 could include tandem switches, communication trunks, central offices, or other telecommunication equipment, including combinations thereof.

Local-exchange carrier (LEC) 360 is a local exchange carrier which provides plain old telephone service (POTS) features to user devices over a geographic area, such as to telephone 370. The POTS service of LEC 360 is associated with the geographic area of service area 390 in FIG. 3. LEC 360 also includes communications equipment to interface over trunks 361-362. It should be understood that although FIG. 3 includes one telephone, other telephones and telecommunication equipment could be served by LEC 360.

Links 351 and 361-362 are PSTN communication trunks in this example, and comprise optical long-haul communication links for exchanging the aggregated communications of multiple users between telecommunication switching equipment.

Wireless links 312-313 each use the Worldwide Interoperability for Microwave Access (WIMAX) protocol in this example. Wireless links 312-313 may each include many different signals sharing the same link as described above for communication link 111. Also in this example, link 371 is a local loop circuit associated with local exchange carrier 360 to provide telecommunication service to POTS telephone 370.

Links 322-323 and 341-342 each are T1 connections capable of transferring IP packets in this example. Links 322-323 and 341-342 could each be a direct link or might include various equipment, intermediate components, systems, and networks. Links 322-323 and 341-342 could each include multiple signals operating in a single pathway in a similar manner as described above for communication link 111.

Figure 4:
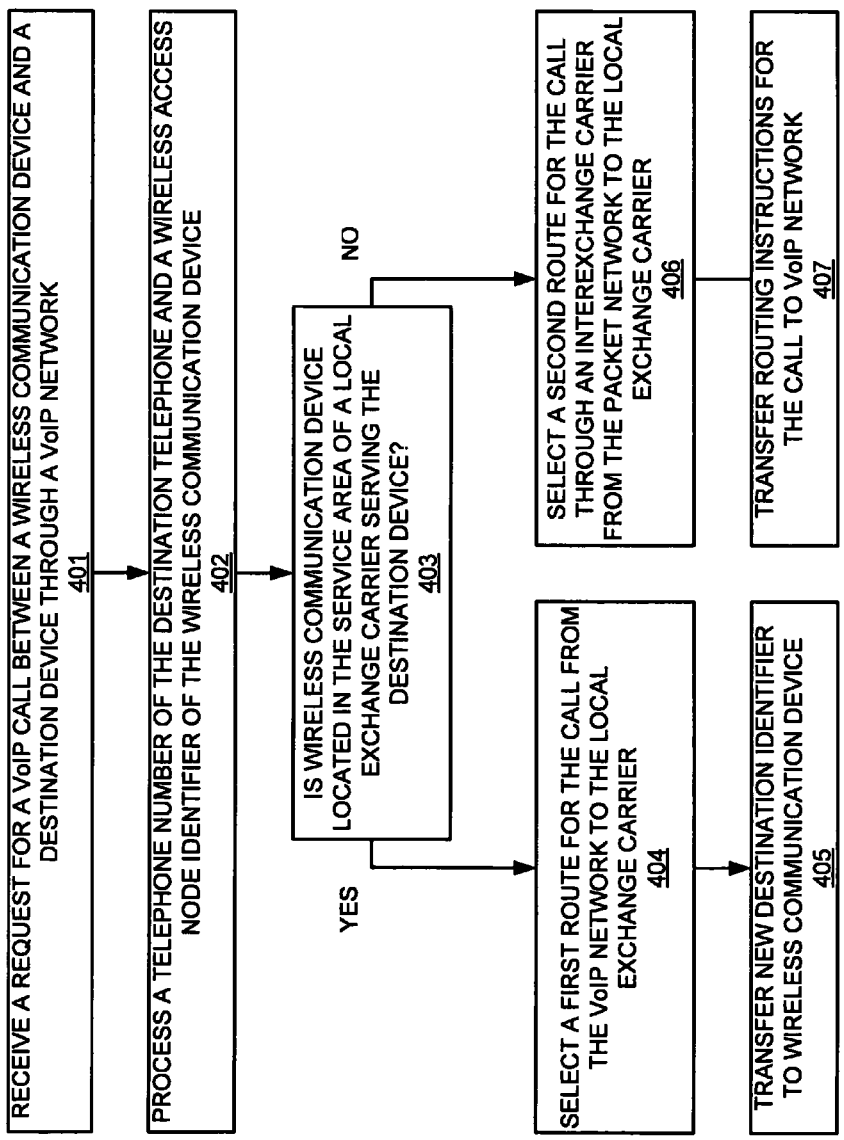
FIG. 4 is a flow diagram illustrating a method of operation of a communication system.

FIG. 4 is a flow diagram illustrating a method of operation of communication system 300, as found in FIG. 3. The operations listed in FIG. 4 are indicated herein parenthetically. In FIG. 4, call processing system 340 receives (401) a request for a VoIP call to telephone 370 originated by wireless communication device (WCD) 310. In this example, the call request is received through VoIP network 330 over link 322 by way of base station 320. Also in this example, the destination for the call is selected by a user of WCD 310 through a user interface of WCD 310, and a SIP call invite message is generated by WCD 310 for delivery to VoIP network 330.

The SIP call invite message for the call includes a destination identifier of telephone 370 and a location identifier of WCD 310. The destination identifier is an identifier associated with telephone 370, and in this example is a telephone number of telephone 370. The location identifier is associated with the geographic location of WCD 310, and in this example the location identifier includes an identifier of base station 320, through which WCD 310 is communicating. The identifier of base station 320 includes a base station identifier (BSID).

Call processing system 340 processes (402) the destination identifier of the destination device, namely the telephone number of telephone 370, and the location identifier of the device initiating the call, namely a base station identifier associated with WCD 310. Call processing system 340 then determines (403) if WCD 310 is located in the same geographic area as telephone 370, such as service area 390 of LEC 360, as shown in FIG. 3. First, the destination identifier could be processed to determine a communication network associated with the destination device. In this example, call processing system 340 could determine, based upon the telephone number of telephone 370, that telephone 370 is served by LEC 360. Call processing system 340 could then process information relating to the geographic area served by LEC 360 to determine if base station 320 is associated with the geographic area, namely service area 390 as served by LEC 360. In this example, call processing system 340 uses information in tower database 345 to determine if base station 320, as identifier by the BSID, is associated with service area 390.

In further examples, other information could be used to identify the destination device or the location of the call initiating device, such as network addresses, domain names, web addresses, hardware addresses, area codes, or other identifiers.

If WCD 310 is located in service area 390 of LEC 360, then call processing system 340 selects (404) trunk 361, through MGC 380, to route the call from VoIP network 330 to LEC 360. Call processing system 340 then transfers routing instructions for delivery to WCD 310 in a SIP acknowledge message through VoIP network 330. In this example, the routing instructions include transferring (405) a new destination identifier for delivery to WCD 310. The new destination identifier indicates a network address associated with MGC 380 in VoIP network 330. Once received by WCD 310, the new destination identifier could instruct WCD 310 to send the VoIP packets of the call addressed for MGC 380 instead of telephone 370. WCD 310 could then include the original destination identifier, namely the telephone number of telephone 370, in another message to MGC 380 to instruct MGC 380 to initiate a call to destination telephone 370. Since MGC 380 is associated only with trunk 361, the call will be routed over trunk 361 to LEC 360. In further examples, call processing system 340 could transfer a message to MGC 380 to instruct MGC 380 to route an incoming call from WCD 310 to telephone 370 over trunk 361 to LEC 360, in this manner, the call by WCD 310 through MGC 380 could be properly routed to telephone 370 without further destination messaging between MGC 380 and WCD 310.

However, if WCD 310 is not located in service area 390 of LEC 360, then call processing system 340 selects (406) trunk 351, through MGC 381, for the call from VoIP network 330 to IXC 350. IXC 350 could then determine that the call should be routed to LEC 360, and subsequently route the call over trunk 362 to LEC 360. Call processing system 340 then transfers routing instructions for the call. In this example, these routing instructions are transferred (407) for delivery to VoIP network 330, where VoIP network 330 routes the VoIP call through MGC 381. Since MGC 381 is associated only with trunk 351, the call will be routed over trunk 351 to IXC 350.

Since the example shown in FIG. 3 has WCD 310 at location 'A' 391 within service are 390 of LEC 360, the call will be routed from VoIP network 330 over trunk 361 to LEC 360 instead of over trunk 351 through IXC 350. However, a VoIP call initiated by WCD 311, at location 'B' 392, to telephone 370 would be routed differently. WCD 311 would communicate wirelessly through base station 321 over wireless link 313. Since base station 321 is not associated with the geographic area served by LEC 360, namely service area 390, a route for a VoIP call to telephone 370 would be selected as trunk 351 through IXC 350 instead of trunk 361 to LEC 360.

Although the example discussed regarding FIG. 4 uses the Session Initiation Protocol (SIP) as a call signaling format, the call signaling format used in VoIP network 330 could include SIP, Real-time Transport Protocol (RTP), IP Multimedia Subsystem (IMS), H.323, Skype™ protocol, or other voice-over-packet call signaling formats. The packets themselves could be Ethernet, IP, ATM, or other packet formats, including combinations thereof, which include at least an address portion and a payload portion.

However, in this example, the communication format of trunks 351 and 361 is a PSTN format, where the format could be TDM, SONET, or some other PSTN format, including combinations thereof. Therefore, communications from VoIP network 330 over trunks 351 and 361 must be converted from the packet format of VoIP network 330 to the PSTN format of trunks 351 and 361. The media gateway controllers (MGC) 380-381 convert between the VoIP packet format and the PSTN format. This conversion could include packetization, de-packetization, buffering, packet inspection, and interfacing the information of the call between telecommunication switches and packet routers.

Advantageously, by selecting a route for a voice-over-packet call based upon how the location of the device initiating the call relates to the location of the destination device, a more effective route can be chosen for the call. For example, if the device initiating the call is in the same service area of a local communication network as the destination device, a cheaper route could be selected. If the location of the device initiating the call and the location of the destination device are not processed to determine a route, then a longer, more expensive, or undesirable route might be selected.

Additionally, when the voice-over-packet network is operated by a different company than local communication networks or interexchange networks, it may be advantageous for the operator of the voice-over-packet network to have control over which path voice-over-packet calls take to reach destinations. This can be especially advantageous when a voice-over-packet call is routed over conventional telephone networks, such as the PSTN, to reach a destination device. The operator of the voice-over-packet network may desire to route calls from wireless communication devices located in the service areas of local telephone carriers directly to the local telephone carriers networks.

In contrast to non-voice-over-packet calls, such as POTS calls, many times the voice-over-packet networks are located far from the wireless communication devices initiating a voice-over-packet call, such as when a wireless communication service provider has centralized voice-over-packet equipment through which all voice-over-packet calls for customers of that service provider are routed. As customers using wireless communication devices roam through the various wireless coverage areas of the wireless communication network of the service provider, voice-over-packet calls initiated by the roaming wireless communication devices can advantageously be routed more directly through local communication networks to destination devices, instead of over long-distance or intermediate communication links to the local communication networks.

For example, when the equipment for a voice-over-packet network is located distantly from the wireless communication device initiating a voice-over-packet call, a default route may force the call through the PSTN equipment nearest to the distant voice-over-packet network equipment. This route may undesirably include traversing an interexchange carrier, such as a long distance carrier, before reaching a local network, such as a local exchange carrier, serving the destination device. Thus, higher costs could be incurred for the call, or contractual obligations could be violated by routing calls over an undesirable long distance carrier. Instead, a route could be selected which routes the voice-over-packet call from the distant voice-over-packet equipment more directly to the local exchange carrier.

Figure 5:
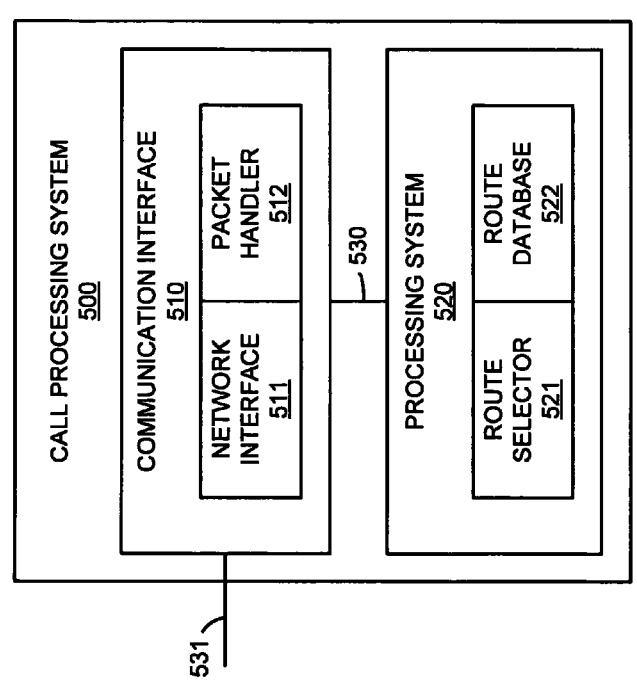
FIG. 5 is block diagram illustrating a call processing system.

FIG. 5 is a block diagram illustrating call processing system 500, as an example of call processing system 140 in FIG. 1 or call processing system 340 in FIG. 3, although call processing system 140 or call processing system 340 may use alternative configurations. Call processing system 500 includes communication interface 510 and processing system 520. Communication interface 510 and processing system 520 communicate over link 530. Call processing system 500 and external systems communicate over link 531.

Communication interface 510 includes network interface 511 and packet handler 512. Network interface 511 includes circuitry and equipment to interface over link 531 with external systems and equipment. For example, network interface 511 could include a T1 interface, an Ethernet interface, an internet protocol (IP) interface, or other network interface equipment. Packet handler 512 includes equipment to decode, packetize, or handle the payloads of data packets received by network interface 511. Additionally, packet handler 512 could include equipment to packetize information received from processing system 520 for transfer over link 531 by network interface 511. Further examples of communication interface 510 could include components that communicate over communication links, such as network cards, ports, RF transceivers, processing circuitry and software, or some other communication devices. Communication interface 510 may be configured to communicate over metallic, wireless, or optical links. Communication interface 510 may be configured to use TDM, IP, Ethernet, optical networking, wireless protocols, voice-over-packet protocols, communication signaling, or some other communication format, including combinations thereof.

Processing system 520 includes route selector 521 and route database 522. Route selector includes equipment or circuitry to process at least a destination identifier and a location identifier to select a communication route from route database 522 for a voice-over-packet call. For example, processing circuitry 405 could include a microprocessor and other circuitry that retrieves and executes operating software from computer-readable storage media, such as memory devices. Memory devices include a disk drive, flash drive, data storage circuitry, or some other computer-readable storage medium. Operating software could include computer programs, firmware, or some other form of computer-readable processing instructions. Operating software may also include an operating system, utilities, drivers, network interfaces, applications, or some other type of software. When executed in processing system 520, the operating software directs processing system 520 to operate call processing system 500 as described herein. In particular, the operating software directs route selector 521 in processing system 500 to process at least a destination identifier and a location identifier to select a route from communication route database 522 for a voice-over-packet call.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a call processing system to route a voice-over-packet call between a wireless communication device and a destination device, wherein the destination device is located in a geographic area served by a local exchange carrier, the method comprising:
   receiving a request for the call originating from the wireless communication device, wherein the request comprises a destination identifier of the destination device and a wireless access node identifier of a wireless access node providing wireless access to the wireless communication device;
   processing the destination identifier and the wireless access node identifier to determine if the wireless access node is located in the geographic area served by the local exchange carrier;
   selecting a first route for the call from a packet network serving the wireless communication device to a first media gateway trunked to the local exchange carrier serving the destination device if the wireless access node is located in the geographic area served by the local exchange carrier;
   selecting a second route for the call from the packet network serving the wireless communication device to a second media gateway trunked to an interexchange carrier trunked to the local exchange carrier serving the destination device if the wireless access node is not located in the geographic area served by the local exchange carrier; and
   transferring routing instructions for the call for delivery to the wireless communication device comprising a network address associated with one of the first media gateway and the second media gateway.

2. The method of claim 1, wherein the request for the call is a session initiation protocol (SIP) call invite message.

3. The method of claim 1, wherein the destination identifier is a network address of the destination device.

4. The method of claim 1, wherein processing the destination identifier and the wireless access node identifier to determine if the wireless access node is located in the geographic area served by the local exchange carrier comprises processing the wireless access node identifier to determine if the wireless access node is associated with the geographic area served by the local exchange carrier.

5. The method of claim 1, wherein the network address of the routing instructions comprise a new destination for the call.

6. The method of claim 1, wherein the packet network is configured to receive communication packets for the call transferred by the wireless communication device addressed to the network address, and route the communication packets for delivery to the network address, wherein the selected one of the first media gateway and the second media gateway receive the communication packets and route the communication packets for delivery to the local exchange carrier.

7. The method of claim 1, wherein transferring the routing instructions for the call for delivery to the wireless communication device comprises transferring a session initiation protocol (SIP) acknowledge message for delivery to the wireless communication device, wherein the acknowledge message comprises the network address.

8. A call processing system to route a voice-over-packet call between a wireless communication device and a destination device, wherein the destination device is located in a geographic area served by a local exchange carrier, comprising:
   a communication interface configured to receive a request for the call originating from the wireless communication device, wherein the request comprises a destination identifier of the destination device and a wireless access node identifier of a wireless access node providing wireless access to the wireless communication device;
   a processing system configured to process the destination identifier and the wireless access node identifier to determine if the wireless access node is located in the geographic area served by the local exchange carrier;
   the processing system configured to select a first route for the call from a packet network serving the wireless communication device to a first media gateway trunked to the local exchange carrier serving the destination device if the wireless access node is located in the geographic area served by the local exchange carrier;
   the processing system configured to select a second route for the call from the packet network serving the wireless communication device to a second media gateway trunked to the an interexchange carrier trunked to the local exchange carrier serving the destination device if the wireless access node is not located in the geographic area served by the local exchange carrier; and
   the communication interface configured to transfer routing instructions for the call for delivery to the wireless communication device comprising a network address associated with one of the first media gateway and the second media gateway.

9. The call processing system claim 8, wherein the request for the call is a session initiation protocol (SIP) call invite message.

10. The call processing system of claim 8, wherein the destination identifier is a network address of the destination device.

11. The call processing system of claim 8, comprising:
   the processing system configured to process the wireless access node identifier to determine if the wireless access node is associated with the geographic area served by local exchange carrier.

12. The call processing system of claim 8,
   wherein the network address of the routing instructions comprises a new destination for the call.

13. The call processing system of claim 8,
   wherein the packet network is configured to receive communication packets for the call transferred by the wireless communication device addressed to the network address, and route the communication packets for delivery to the network address, wherein the selected one of the first media gateway and the second media gateway receive the communication packets and route the communication packets for delivery to the local exchange carrier.

14. The call processing system of claim 8, comprising:
the communication interface configured to transfer a session initiation protocol (SIP) acknowledge message for delivery to the wireless communication device, wherein the acknowledge message comprises the network address.

\* \* \* \* \*